United States Patent
Koncsek

(10) Patent No.: US 6,883,751 B2
(45) Date of Patent: Apr. 26, 2005

(54) APPARATUS AND METHOD FOR PREVENTING FOREIGN OBJECT DAMAGE TO AN AIRCRAFT

(75) Inventor: Joseph L. Koncsek, Vashon, WA (US)

(73) Assignee: The Boeing Company, Chicago, IL (US)

( * ) Notice: Subject to any disclaimer, the term of this patent is extended or adjusted under 35 U.S.C. 154(b) by 95 days.

(21) Appl. No.: 10/428,399

(22) Filed: May 2, 2003

(65) Prior Publication Data
US 2004/0245384 A1 Dec. 9, 2004

(51) Int. Cl.7 ............................................. B64D 27/00
(52) U.S. Cl. ................................... 244/55; 244/53 B
(58) Field of Search ........................... 244/121, 53 B, 244/55, 12.1, 12.5; 60/39.092

(56) References Cited

U.S. PATENT DOCUMENTS

| | | | | |
|---|---|---|---|---|
| 2,698,149 A | * | 12/1954 | Greenwood et al. | 244/113 |
| 3,168,999 A | * | 2/1965 | Warren et al. | 244/53 R |
| 3,196,598 A | * | 7/1965 | Olson | 55/306 |
| 3,527,430 A | * | 9/1970 | Smith | 244/53 A |
| 3,599,429 A | * | 8/1971 | Bigelis et al. | 60/39.092 |
| 4,004,760 A | * | 1/1977 | Ando et al. | 244/53 B |
| 4,047,911 A | * | 9/1977 | Krojer | 55/306 |
| 4,070,827 A | * | 1/1978 | Vanfleet et al. | 60/204 |
| 4,165,849 A | * | 8/1979 | Fox | 244/113 |
| 5,123,240 A | * | 6/1992 | Frost et al. | 60/779 |
| 5,558,919 A | | 9/1996 | Toni et al. | |
| 5,697,394 A | * | 12/1997 | Smith et al. | 137/15.1 |
| 5,915,403 A | | 6/1999 | McConachie et al. | |
| 6,129,309 A | | 10/2000 | Smith et al. | |
| 6,264,137 B1 | * | 7/2001 | Sheoran | 244/53 B |
| 6,349,899 B1 | * | 2/2002 | Ralston | 244/53 B |

* cited by examiner

Primary Examiner—Michael J. Carone
Assistant Examiner—T. Nguyen
(74) Attorney, Agent, or Firm—Thomas F. Lebens; Fitch, Even, Tabin & Flannery

(57) ABSTRACT

An aircraft designed to prevent foreign object damage to the aircraft. The aircraft includes an engine coupled aft of the aircraft's landing gear, and a deflecting member is coupled to the aircraft between the landing gear and an inlet of the engine so that when the deflecting member is extended, it intersects with a portion of lines of sight between the landing gear and an inlet of the engine.

19 Claims, 4 Drawing Sheets

APPARATUS AND METHOD FOR PREVENTING FOREIGN OBJECT DAMAGE TO AN AIRCRAFT

BACKGROUND OF THE INVENTION

1. Field of the Invention

The present invention relates generally to aircraft and more specifically to measures to prevent foreign object damage to aircraft. Even more specifically, the present invention relates to measures to prevent foreign object damage to an aircraft engine.

2. Discussion of the Related Art

Aircraft are susceptible to Foreign Object Damage (FOD) from various objects that impact the aircraft. For example, coins, personnel badges, loose hardware, tools, paper clips, pens, runway fragments, catering supplies, pieces of luggage, building materials, rocks, sand, hats, trash, and birds all potentially may inflict damage to an aircraft.

An aircraft's landing gear may project these objects at the aircraft or the landing gear may potentially become an airborne object itself. For example, when a potential FOD producing object is on a runway, the potential exists for aircraft landing gear, e.g., the aircraft's tires, to come in contact with the object. If the landing gear has impacted an object, the object itself may be projected off of the runway and towards the aircraft. It is also possible that pieces of the tire itself may be dislocated and be projected towards the aircraft.

Damage to the aircraft's jet engines is especially troublesome because performance of the jet engines is critical to safe flight. Thus, it is important to prevent as many objects as possible from becoming ingested jet engines.

SUMMARY OF THE INVENTION

In one embodiment, the invention can be characterized as an aircraft including: landing gear coupled to the aircraft, an engine coupled aft of the landing gear to the aircraft and a deflecting member coupled to the aircraft. The deflecting member includes an extended end and a mounting portion configured to couple with the aircraft, and the deflecting member is positioned between the landing gear and the engine so as to intersect with a portion of lines of sight between the landing gear and an inlet of the engine.

In another embodiment, the invention can be characterized as a method, and means for accomplishing the method, of preventing foreign objects from damaging an engine of an aircraft, the method including the steps of: extending a deflecting member to intersect a portion of lines of sight between landing gear of the aircraft and an inlet of the engine in response to the aircraft being in close proximity to a runway and retracting the deflecting member after the aircraft has become airborne.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

Figure 1:
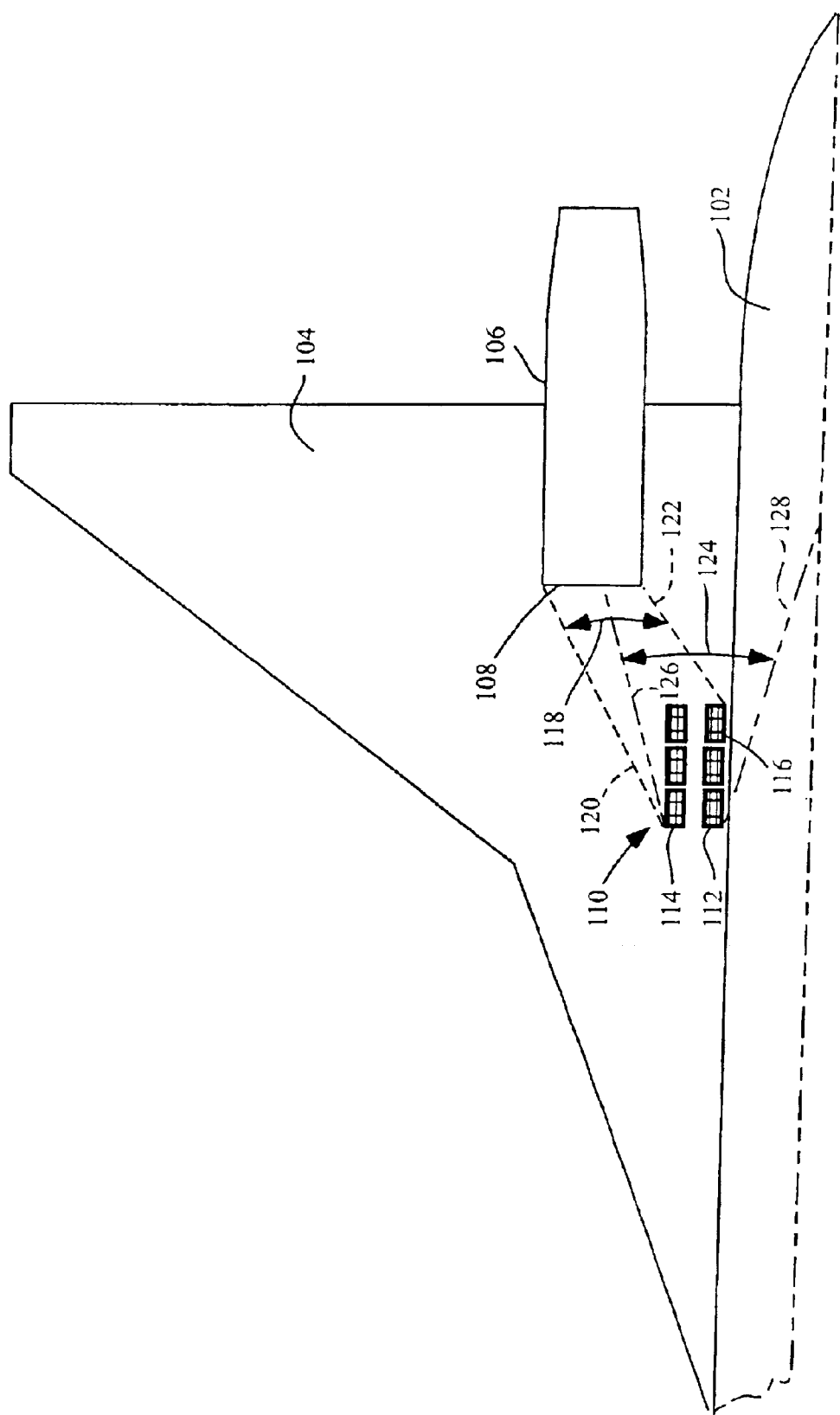
FIG. 1 is a is a top view of an aircraft illustrating exposure to an aircraft engine from FOD projecting from landing gear of the aircraft.

Referring first to FIG. 1, shown is a top view of an aircraft illustrating exposure to an aircraft engine from FOD projecting from landing gear of the aircraft. Shown is an aircraft body 102, an aircraft wing 104, an aircraft engine 106, an engine inlet 108, landing gear 110 including a forward inboard tire 112, a forward outboard tire 114 and an aft inboard tire 116. Also shown is a line-of-sight zone 118 defined by an outboard line-of-sight boundary 120 and an inboard line-of-sight boundary 122, and a threat zone 124 defined by an outboard threat zone boundary 126 and an inboard threat zone boundary 128.

The aircraft wing 104 is coupled to the aircraft body 102, the aircraft engine 106 is coupled to the aircraft wing 104 and the engine inlet 108 is located at a forward portion of the aircraft engine 106. The landing gear 110 is shown directly below the aircraft wing 104, and the landing gear includes the forward inboard tire 112, forward outboard tire 114 and aft inboard tire 116. The inboard line-of-sight boundary 122 is shown between a trailing and inboard edge of the aft inboard tire 116 and an inboard edge of the engine inlet 108. The outboard line-of-sight boundary 120 is shown between a leading and outboard edge of the forward outboard tire 114 and an outboard portion of the engine inlet 108.

The inboard threat zone boundary 128 is shown between a leading and inboard edge of the leading inboard tire and an outboard portion of the aircraft body 102. The outboard threat zone boundary 126 is shown between a leading and outboard edge of the leading outboard tire 114 and a portion of the engine inlet 108 between the in board and outboard edge of the engine inlet 108. The threat zone 124 is shown as an area between the inboard threat zone boundary 128 and the outboard threat zone boundary 126.

As shown in FIG. 1, the aircraft engine 106 and the engine inlet 108 are located aft of the aircraft landing gear 110; thus exposing the aircraft engine 106 to debris that may be kicked up from the landing gear 110 during take-off and landing. In particular, the line-of-sight zone 118 which is an area comprising a collection of lines-of-sight between the inboard line-of-sight boundary 122 and the outboard line-of-sight boundary 120, is a zone of higher risk from FOD as compared to FOD projecting from outside the line-of-sight zone 118 because the line-of-sight zone 118 is a collection of direct paths from the landing gear 110 to the engine inlet 108. Although the line-of-sight zone 118 is shown in two dimensions in FIG. 1, it should be recognized that the line-of sight zone 118 is a three dimensional volume defined by lines-of-sight between outer edges of the engine inlet 108 and both an inboard edge of the aft inboard tire 116 and a leading and outboard edge of the forward outboard tire 114.

The threat zone 124 is an area where there is an especially high risk of damage from FOD being projected from the landing gear 110 because the threat zone 124 includes an area directly behind the landing gear 110. As shown, the threat zone 124 overlaps with the line-of-sight zone 118, and the engine inlet 108 is within a portion of the threat zone 124. Thus, the engine is generally susceptible to FOD because it is aft of and within lines-of-sight of the landing gear 110, and the engine 106 is especially susceptible to FOD because at least a portion of the engine inlet 108 is within the threat zone 124.

Obstructing at least a portion of the lines-of-sight between the landing gear 110 and the engine 106, however, reduces the risk of FOD projected from the landing gear 110 entering the engine inlet 108. Thus, according to several embodiments of the present invention a flap is employed to obstruct lines-of-sight, and hence FOD, emanating from the landing gear 110.

Figure 2A:
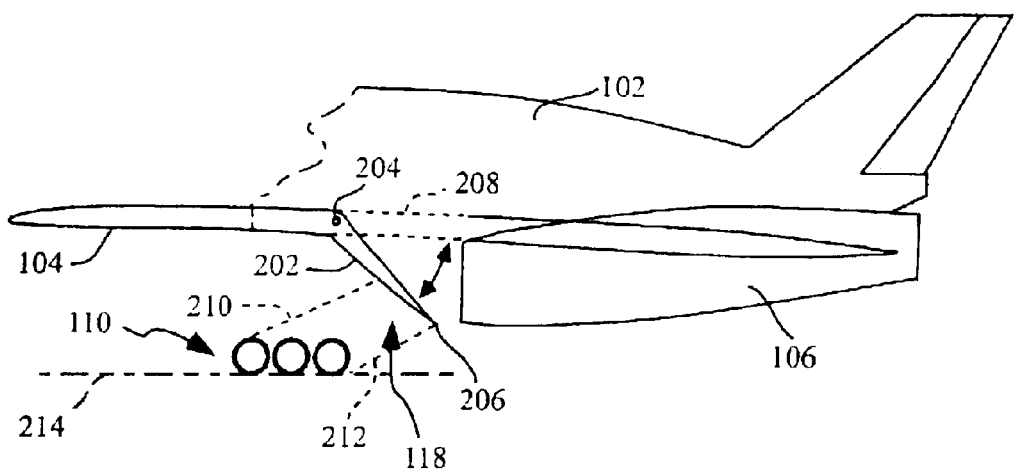
FIGS. 2A, 2B and 2C are side, front and plan views respectively of the aircraft of FIG. 1 employing a FOD flap to obstruct a least a portion of lines-of-sight between the landing gear and the engine in accordance with one embodiment of the present invention.
Figure 2B:
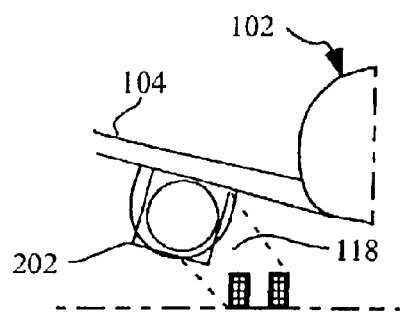
Figure 2C:
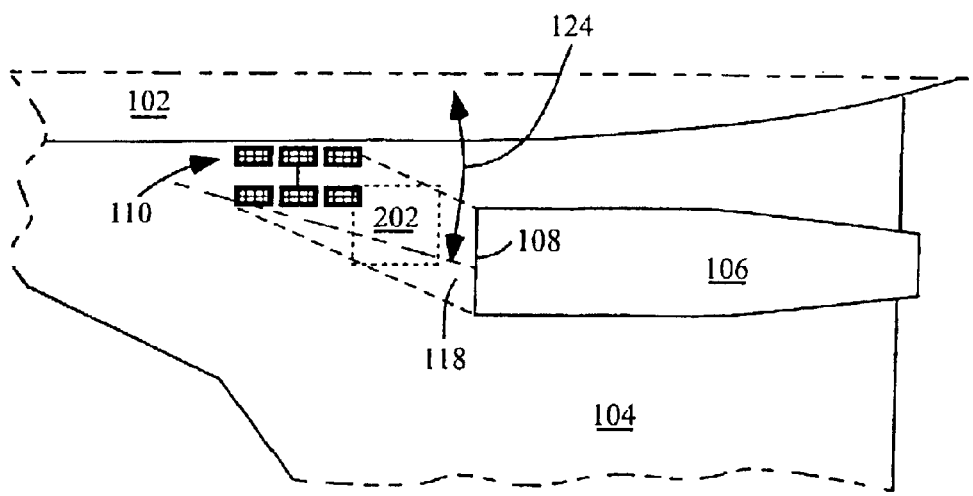

Referring next to FIGS. 2A, 2B and 2C, for example, are shown are side, front and plan views respectively of the aircraft of FIG. 1 employing a FOD flap to obstruct a least a portion of the lines-of-sight between the landing gear and the engine in accordance with one embodiment of the present invention.

Referring first to FIG. 2A shown are the landing gear 110, the aircraft body 102, the aircraft wing 104, the line-of-sight zone 118 and the engine 106. Also shown is a FOD flap 202 in a deployed position with an attached end 204 (also referred to as a mounting portion 204) coupled to the aircraft wing 104 forward of the engine 106, and a free end 206 deployed below the aircraft wing 104 so that a forward face of the FOD flap 202 is interposed between the landing gear 110 and the engine 106. Also shown with broken lines in the wing 104 is a stowed location 208 for the FOD flap 202.

As shown in FIG. 2A the attached end 204 of FOD flap 202 in several embodiments is mounted mid-wing along a substantially horizontal axis so that the free end 206 rotates about the substantially horizontal axis to intersect portions of the line-of-sight zone 118.

In operation, the FOD flap 202 in several embodiments is extended (i.e., the free end 206 is rotated and/or telescopically extended) out to intersect with the line-of-sight zone 118 when the aircraft is in close proximity to a runway, e.g., during a landing approach or when taxiing on a runway. In some embodiments for example, the FOD flap 202 is extended to intersect upper and lower boundaries 210, 212 of the line-of-sight zone 118 when the aircraft is below a threshold elevation with respect to the ground plane 214.

When there is a lower risk of FOD e.g., when the aircraft is airborne, the FOD flap 202 in several embodiments is retracted and positioned in the stowed location 208 which in the present embodiment is substantially parallel with the wing 104. In this way the FOD flap 202 does not place unnecessary drag on the aircraft and does not interfere with a volume of air that must be pulled through the engine 106.

In one embodiment, as shown in FIG. 2B, the FOD flap 202 is sized and configured so that a forward side of the FOD flap 202 in a deployed position intersects the entire line-of-sight zone 118. Thus, a view of the engine inlet 108 is completely obstructed when viewed from a location proximate the landing gear 110. In this way, the IOD flap 202 helps to prevent a larger percentage of FOD as compared to embodiments where the FOD flap 202 intersects less that an entire cross section of the line-of-sight zone 118.

As shown in FIG. 2C, the FOD flap 202 according to several embodiments is positioned to obstruct a portion of the threat zone that overlaps with the inlet 108 of the engine 106. Thus, the FOD flap 202 in these embodiments is positioned to intersect with a region of higher risk due to FOD that is kicked up, and/or generated from the landing gear 110.

As shown in FIGS. 2A, 2B and 2C, the FOD flap 202 in several embodiments is mounted to the aircraft in a substantially horizontal position, i.e., the attached end 204 is mounted along a substantially horizontal axis, and when stowed, the FOD flap 202 is positioned substantially parallel with the wing 104.

In some embodiments, portions of the FOD flap 202, e.g., a deflecting surface, are deformable to absorb more energy from FOD, and thus, reduce the ability of the FOD to inflict damage to the engine 106 and/or other portions of the aircraft. For example, in one embodiment the FOD flap 202 is constructed from a composite of materials including, for example, Kevlar that deform upon contact with FOD. In another embodiment, the FOD flap 202 includes a mesh material on a forward facing surface of the FOD flap 202. In yet another embodiment, the FOD flap 202 includes a net structure to help absorb energy of FOD impacting with the FOD flap 202.

In additional embodiments, instead of rotating the free end 206 of the FOD flap 202 about the mounting portion 204 to extend the FOD flap 202 into the line-of-sight zone 118, the FOD flap 202 is deployed in a telescopic fashion. One of ordinary skill in the art recognizes, however, that both telescopic and rotating means may be utilized to deploy a FOD flap and that such variations are well within the scope of the present invention.

Figure 3:
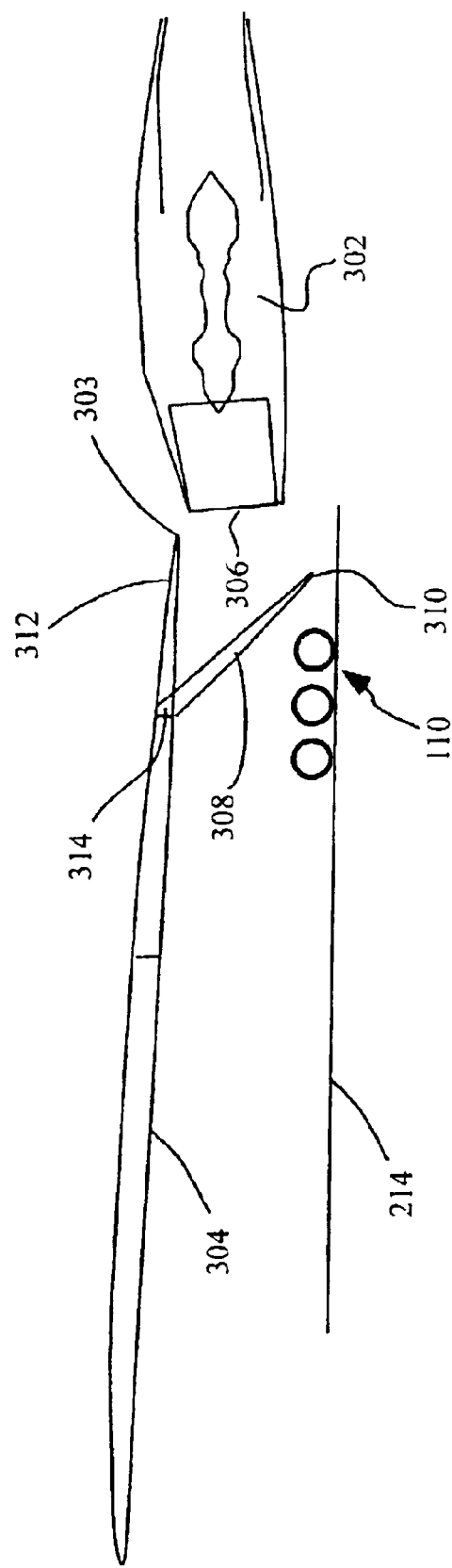
FIG. 3 is an alternative embodiment of the aircraft with an engine positioned aft of a trailing edge of a wing.

Referring next to FIG. 3, shown is an alternative embodiment of the aircraft with an engine positioned aft of a trailing edge of a wing. Shown is an engine 302 positioned with respect to a wing 304 so that at least a portion of an inlet 306 of the engine 302 is aft of a trailing edge 303 of the wing. Also shown are landing gear 110 positioned forward of the engine 302 and forward of the trailing edge 303 of the wing 304, and a FOD flap 308 is shown coupled with the wing 304 so that a free end 310 of the FOD flap 308 forms a portion of a trailing edge 303 of the wing when in a stowed position 312.

As shown in FIG. 3, an attached end 314 (also referred to as a mounting portion 314) of the FOD flap 308 in the present embodiment is coupled with the aircraft wing 304 in a substantially horizontal manner so the when the FOD flap 308 is stowed, the forward face of the FOD flap 308 is positioned substantially parallel with the wing 304.

In some embodiments, the FOD flap 308 is implemented by modifying main flaps already existing on an aircraft. Thus, in some embodiments, the FOD flap 308 helps provide lift to an aircraft when deployed, e.g., during takeoff and landing.

In operation, the FOD flap 308 in several embodiments is extended (i.e., the free end 310 is rotated and/or telescopically extended) out to intersect with a line-of-sight zone when the aircraft is in close proximity to a runway, e.g., during a landing approach or when taxiing on a runway. In some embodiments for example, the FOD flap 308 is extended when the aircraft is below a threshold elevation with respect to the ground plane 214.

When there is a lower risk of FOD e.g., when the aircraft is airborne, the FOD flap 308 in several embodiments is retracted and positioned in the stowed location 312. In this way the FOD flap 308 does not place unnecessary drag on the aircraft and does not interfere with the volume of air that must be pulled through the engine 302.

Figure 4:
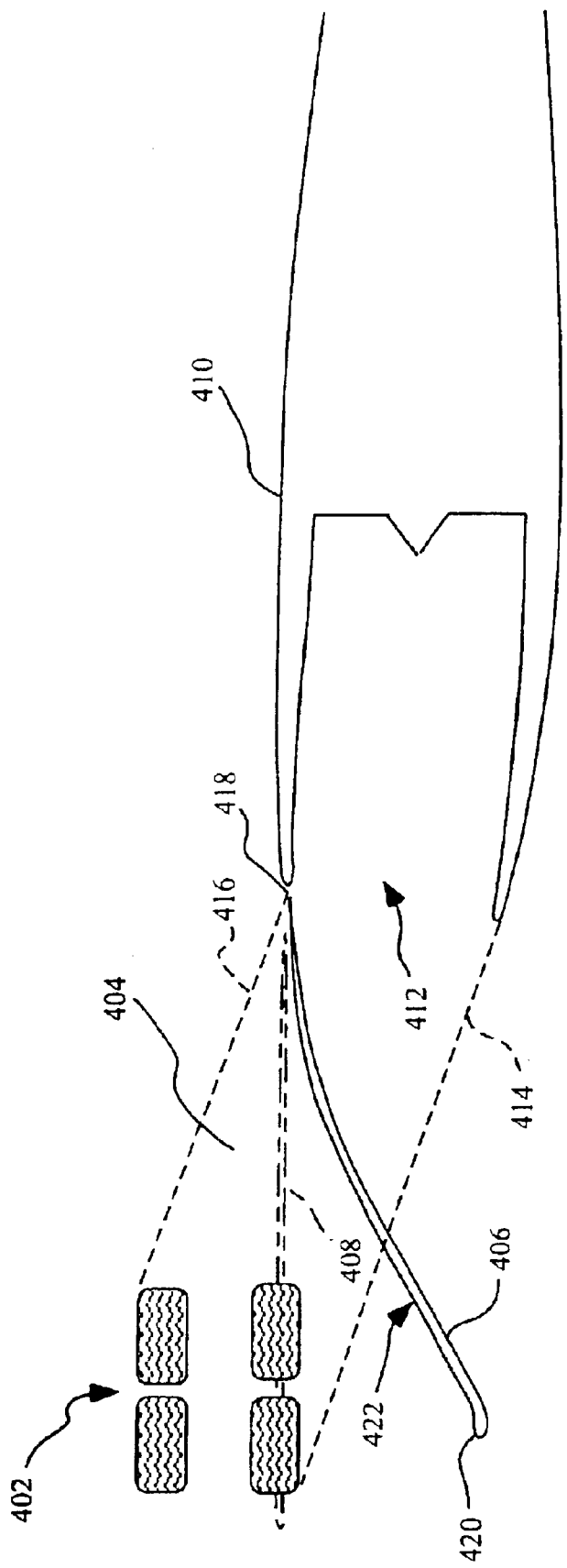
FIG. 4 is a partial plan view of an aircraft illustrating a vertically mounted FOD flap in accordance with another embodiment of the present invention.

Referring next to FIG. 4, shown is a partial plan view of an aircraft illustrating a vertically mounted FOD flap in accordance with another embodiment of the present invention. Shown are landing gear 402, a line-of-sight zone 404, a FOD flap 406 in a deployed position, a FOD flap cruise position 408, an engine 410 and an engine inlet 412.

The engine 410 is positioned aft of the landing gear 402 with the engine inlet 412 facing in a direction of the landing gear 402, and the line-of-site zone 404 is shown as a region between an outboard line-of-sight boundary 414 and an inboard line-of sight boundary 416. The outboard line of-sight boundary 414 is shown as a broken line between a forward and outboard portion of the landing gear 402 and an outboard portion of the engine inlet 412, and the inboard line-of-sight boundary 416 is shown as a broken line between an inboard and aft portion of the landing gear 402 and an inboard portion of the engine inlet 412. The FOD flap 406 is shown intersecting the line-of sight zone 404 with an attached end 418 proximate to an inboard portion of the engine inlet 412 and a free end 420 positioned forward of the engine inlet 412 and outboard of the inboard portion of the engine inlet 412.

As shown in FIG. 4, the FOD flap 406 in the present embodiment is mounted so that a deflecting face 422 of the FOD flap is substantially perpendicular to the ground plane 214, and the free and attached ends 420, 418 of the FOD flap 406 are substantially vertical with respect to the ground plane 214.

In operation, when the aircraft is cruising, the FOD flap 406 in several embodiments is positioned in the FOD flap cruise position 408 that is substantially parallel with the direction of airflow to limit drag on the aircraft and allow the engine to draw unobstructed air.

When the aircraft is in close proximity to a runway, the FOD flap 406 in several embodiments is extended (i.e., the free end 420 is rotated out) to intersect with the line-of-sight zone 404, and retracted (i.e., rotated back into the cruise position 408) when the aircraft is airborne.

While the invention herein disclosed has been described by means of specific embodiments and applications thereof, numerous modifications and variations could be made thereto by those skilled in the art without departing from the scope of the invention set forth in the claims.

What is claimed is:

1. An aircraft comprising:

landing gear coupled to the aircraft;

an engine coupled aft of the landing gear to the aircraft; and a deflecting member coupled to the aircraft, wherein the deflecting member comprises an extended end and a mounting portion configured to couple with the aircraft; and wherein the deflecting member is positioned between the landing gear and the engine so as to intersect with a portion of lines of sight between the landing gear and an inlet of the engine;

wherein the deflecting member forms a portion of trailing edge of a wing of the aircraft when stowed and at least a portion of the inlet of the engine is aft of the wing's trailing edge.

2. The aircraft of claim 1, wherein the deflecting member intersects each of the lines of sight between the landing gear and the inlet of the engine.

3. The aircraft of claim 1, wherein the extended end of the deflecting member is configured to rotate about the mounting portion and the mounting portion is mounted to the aircraft in a substantially vertical position with respect to a ground plane.

4. The aircraft of claim 1, wherein the extended end of the deflecting member is configured to rotate about the mounting portion and the mounting portion is mounted so that when the deflecting member is stowed, a forward face of the deflecting member is substantially parallel with respect to a wing the aircraft.

5. The aircraft of claim 1, wherein the deflecting member is deformable.

6. The aircraft of claim 5, wherein the deflecting member comprises a mesh.

7. The aircraft of claim 1 wherein the deflecting member is configured to telescopically retract.

8. A method for preventing foreign objects from damaging an engine of an aircraft comprising:

extending a deflecting member to intersect a portion of lines of sight between landing gear of the aircraft and an inlet of the engine in response to the aircraft being in close proximity to a runway; and retracting the deflecting member after the aircraft has become airborne;

wherein the deflecting member forms a portion of a trailing edge of a wing of the aircraft when retracted and at least a portion of the inlet of the engine is aft of the wing's trailing edge.

9. The method of claim 8 wherein the step of extending the deflecting member comprises extending the deflecting member to cover each of the lines of sight between the landing gear and the engine inlet.

10. The method of claim 8, wherein the step of extending the deflecting member comprises rotating an extended end about a mounting portion.

11. The method of claim 8, wherein the step of extending comprises rotating an extended end of the deflecting member in a direction that is substantially parallel with a wing of the aircraft.

12. The method of claim 8, wherein the step of extending comprises rotating an extended end of the deflecting member in a vertical direction with respect to a ground plane.

13. The method of claim 8, wherein the step of extending the deflecting member comprises telescopically extending the deflecting member.

14. An aircraft comprising:

means for extending a deflecting means to intersect a portion of lines of sight between landing gear of the aircraft and an inlet of the engine in response to the aircraft being in close proximity to a runway; and means for retracting the deflecting member after the aircraft has become airborne;

wherein the deflecting means form a portion of a trailing edge of a wing of the aircraft when retracted and at least a portion of the inlet of the engine is aft the wing's trailing edge.

15. The aircraft of claim 14 wherein the deflecting means intersects each of the lines of sight between the landing gear and the engine inlet when extended.

16. The aircraft of claim 14, wherein the means for extending comprises means for rotating an extended end of the deflecting member in a direction that is substantially parallel with a wing of the aircraft.

17. The aircraft of claim 14, wherein the means for extending comprises means for rotating an extended end of the deflecting means in a vertical direction with respect to a ground plane.

18. The aircraft of claim 14, wherein the means for extending the deflecting member comprises means for telescopically extending the deflecting member.

19. The aircraft of claim 14, wherein the deflecting means comprises means for deforming when contacting a foreign object.

* * * * *

UNITED STATES PATENT AND TRADEMARK OFFICE
CERTIFICATE OF CORRECTION

PATENT NO. : 6,883,751 B2
DATED : April 26, 2005
INVENTOR(S) : Koncsek

It is certified that error appears in the above-identified patent and that said Letters Patent is hereby corrected as shown below:

Column 5,
Line 66, after "wing" insert -- of --.

Signed and Sealed this

Twenty-ninth Day of November, 2005

JON W. DUDAS
*Director of the United States Patent and Trademark Office*